(12) United States Patent
Do et al.

(10) Patent No.: US 6,928,048 B1
(45) Date of Patent: Aug. 9, 2005

(54) GUARD SECTION LENGTH DETECTING DEVICE AND METHOD FOR ORTHOGONAL FREQUENCY DIVISION MULTIPLEXING SYSTEM RECEIVER

(75) Inventors: Sang-hyun Do, Seoul (KR); Dong-kyu Kim, Pusan (KR); Hyung-jin Choi, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/509,607

(22) PCT Filed: Sep. 28, 1998

(86) PCT No.: PCT/KR98/00299

§ 371 (c)(1),
(2), (4) Date: Jul. 14, 2000

(87) PCT Pub. No.: WO99/17492

PCT Pub. Date: Apr. 8, 1999

(30) Foreign Application Priority Data

Sep. 30, 1997 (KR) .................................. 97-50377

(51) Int. Cl.[7] .......................... H04J 11/00; H04J 4/00; H04L 12/26
(52) U.S. Cl. ...................... 370/208; 370/252; 370/436
(58) Field of Search ............................... 370/201, 203, 370/208, 210, 343, 345, 350, 436, 478, 480, 370/503, 504, 516, 517, 252; 375/354, 371

(56) References Cited

U.S. PATENT DOCUMENTS

| | | | | |
|---|---|---|---|---|
| 5,496,292 A | * | 3/1996 | Burnham | .................. 604/526 |
| 5,652,772 A | * | 7/1997 | Isaksson et al. | ............ 375/367 |
| 5,812,523 A | * | 9/1998 | Isaksson et al. | ............ 370/208 |
| 5,953,311 A | * | 9/1999 | Davies et al. | ................ 370/210 |
| 5,991,289 A | * | 11/1999 | Huang et al. | ................ 370/350 |
| 6,088,327 A | * | 7/2000 | Muschallik et al. | ........ 370/210 |
| 6,125,124 A | * | 9/2000 | Junell et al. | ................ 370/503 |
| 6,459,744 B1 | * | 10/2002 | Helard et al. | ................ 375/354 |

FOREIGN PATENT DOCUMENTS

| | | | | |
|---|---|---|---|---|
| EP | 0 772 332 A2 | | 5/1997 | |
| GB | 0772332 A2 | * | 7/1997 | ........... H04L 27/26 |

* cited by examiner

*Primary Examiner*—Hassan Kizou
*Assistant Examiner*—Gregory Sefcheck
(74) *Attorney, Agent, or Firm*—Sughrue Mion, PLLC

(57) ABSTRACT

An apparatus for detecting a guard interval length (type) of a transmission symbol among the structure of an orthogonal frequency division multiplexing (OFDM) system receiver, to ensure proper operation of a symbol start detector and a fast Fourier transform (FFT) window position controller, is provided. This apparatus includes an analog-to-digital converter (ADC) for converting a received OFDM signal into digital complex samples, a symbol start position detector for detecting a symbol start position with reference to information on a guard interval length among the complex samples output by the ADC, a symbol start position difference detector for detecting the difference between the symbol start position detected by the symbol start position detector and a symbol start position delayed for a predetermined symbol time, a guard interval length detector for comparing the symbol start position difference detected by the symbol start position difference detector with a predetermined guard interval decision reference value and detecting the length of the guard interval, and an FFT window position controller for shifting the FFT window position using the guard interval length detected by the guard interval length detector and the symbol start information detected by the symbol start detector, to activate an FFT at the shifted FFT window position. The lengths of various guard intervals are automatically detected in the OFDM receiver, thus performing accurate FFT window recovery.

12 Claims, 3 Drawing Sheets

GUARD SECTION LENGTH DETECTING DEVICE AND METHOD FOR ORTHOGONAL FREQUENCY DIVISION MULTIPLEXING SYSTEM RECEIVER

TECHNICAL FIELD

The present invention relates to an orthogonal frequency division multiplexing (OFDM) system, and more particularly, to a device and method for detecting a guard interval length in an OFDM receiver.

BACKGROUND ART

FIG. 1 is a block diagram of a receiver in a general OFDM system, including an analog-to-digital converter (ADC) 110, a symbol start detector 120, a fast Fourier transform (FFT) window position controller 130, and a fast Fourier transformer (FFT) 140.

First, considering a symbol of an OFDM signal, when N subcarriers are used in an OFDM system, the symbol is comprised of N useful data samples as the output of an inverse fast Fourier transform (IFFT) for transmission, and a guard interval having G sample lengths to be inserted before a useful data section to prevent interference between symbols.

Here, the guard interval copies the end portion of the useful data section. A transmitter (not shown) adds G complex values to N complex values output by an inverse fast Fourier transformer (IFFT), and sequentially transmits a symbol comprised of a total of (G+N) samples.

Here, the guard interval is generally longer than a delay spread time of a channel. For example, a European digital TV broadcasting standard defines a guard interval having a length of ¼, ⅛, 1⁄16 or 1⁄32 (hereinafter, called a ¼ mode, a ⅛ mode, a 1⁄16 mode, and a 1⁄32 mode) of an actual symbol length. A transmitting side selects a length among these and uses the selected length. A receiver must perform accurate time synchronization to recover a received OFDM signal. The time synchronization is comprised of FFT window position recovery for parallel processing of an accurate signal, and sampling clock recovery for controlling a sampling clock of a received signal having a maximum signal-noise-ratio (SNR).

$$s_j = \sum_{n=-G}^{N-1} x_{j,n} = \sum_{n=-G}^{-1}\sum_{k=0}^{N-1} X_{j,k} e^{j2\pi(N+n)/N} + \sum_{n=0}^{N-1}\sum_{k=0}^{N-1} X_{j,k} e^{j2\pi kn/N} \quad (1)$$

Equation 1 expresses a j-th symbol comprised of a useful interval and a guard interval which are output by an IFFT (not shown) of a transmitter. Here, j denotes a symbol number, k is a carrier index, N is the number of useful data samples, n indicates a sampling time, and X(•) and x(•) respectively denote an input complex value and an output complex value of the transmission IFFT. In the right side of Equation 1, the first term is a guard interval portion and the second term is a useful data portion.

As shown in FIG. 1, the ADC 110 samples a received OFDM signal. The symbol start detector 120 detects information on a start portion of a symbol using the type of guard interval and the sampled OFDM signal. The FFT window controller 130 designates an FFT window point in time to activate the useful data portion of the FFT 140 using length information on the guard interval and length information of the symbol start portion detected by the symbol start detector 120. However, a device for detecting information on the length of the guard interval has not been developed up to now, and thus correct operation of the symbol start detector 120 and the FFT window controller 130 cannot be ensured.

DISCLOSURE OF THE INVENTION

It is an objective of the present invention to provide a method of detecting the length of a guard interval, whereby accurate FFT window recovery is performed by automatically searching for the length of the guard interval by calculating the difference between symbol start points in time in an OFDM receiver.

It is an objective of the present invention to provide a device for detecting the length of a guard interval, whereby accurate FFT window recovery is performed by automatically searching for the length of the guard interval by calculating the difference between symbol start points in time in an OFDM receiver.

To achieve the first objective, there is provided a method of detecting the type of guard interval to recover a symbol start position in an orthogonal frequency division multiplexing (OFDM) receiver for receiving an OFDM symbol comprised of a useful data interval and a guard interval, the method comprising the steps of: (a) detecting the difference between a symbol start position of a received OFDM signal and a symbol start position delayed during at least two symbols; and (b) detecting the length of the guard interval by comparing the symbol start position difference detected by the step (a) to a predetermined guard interval decision reference value.

To achieve the second objective, there is provided an apparatus for detecting the type of guard interval in an orthogonal frequency division multiplexing (OFDM) receiver for receiving an OFDM symbol comprised of useful data interval and a guard interval, to recover a fast Fourier transform (FFT) window position, the apparatus comprising: an analog-to-digital converter (ADC) for converting a received OFDM signal into digital complex samples; a symbol start position detector for detecting a symbol start position with reference to information on a guard interval length among the complex samples output by the ADC; a symbol start position difference detector for detecting the difference between the symbol start position detected by the symbol start position detector and a symbol start position delayed for a predetermined symbol time; a guard interval length detector for comparing the symbol start position difference detected by the symbol start position difference detector with a predetermined guard interval decision reference value and detecting the length of the guard interval; and an FFT window position controller for shifting the FFT window position using the guard interval length detected by the guard interval length detector and the symbol start information detected by the symbol start detector, to activate an FFT at the shifted FFT window position, wherein the symbol start position difference detector comprises: a symbol delay for delaying by two symbols the symbol start position detected by the symbol start position detector; and a subtractor for calculating the difference between the symbol start position detected by the symbol start position detector and the symbol start position output by the symbol delay.

BEST MODE FOR CARRYING OUT THE INVENTION

Figure 1:
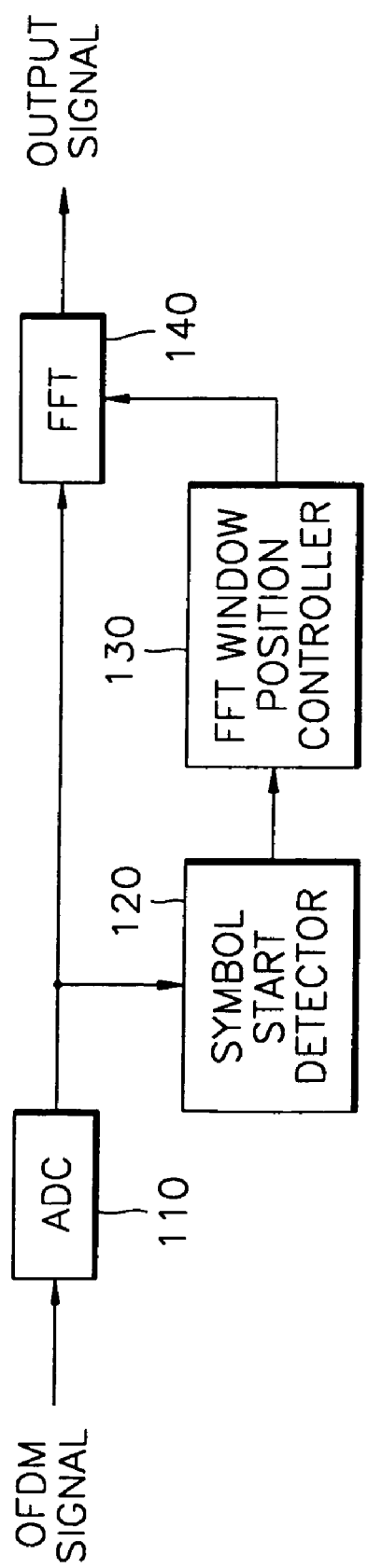
FIG. 1 is a block diagram illustrating the configuration of a general OFDM system receiver.
Figure 2:
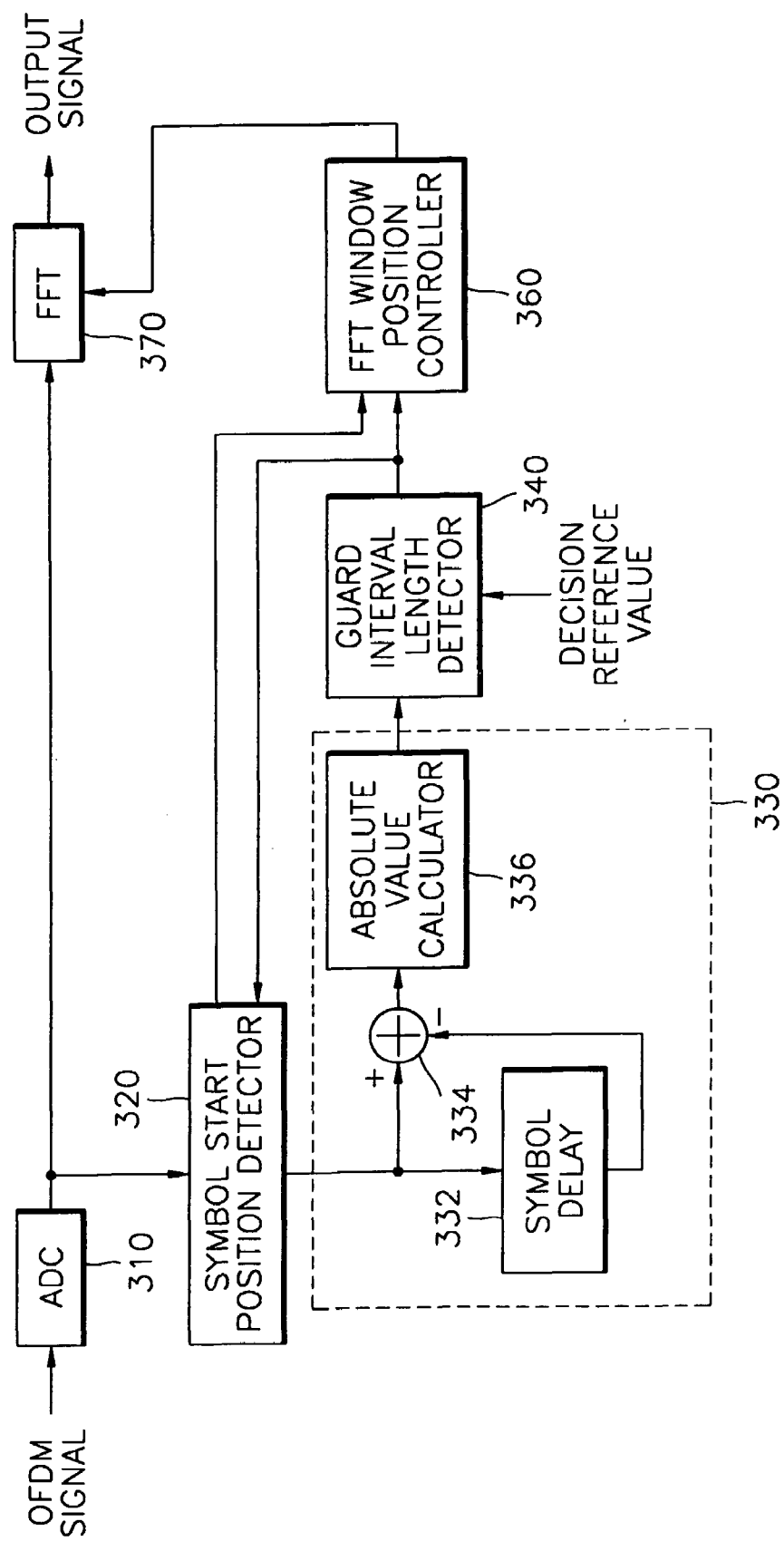
FIG. 2 is a block diagram illustrating an FFT window position recovering apparatus in an OFDM system receiver according to the present invention.

Referring to FIG. 2, an FFT window position recovering apparatus includes an ADC 310, a symbol start position detector 320, a symbol start position difference detector 330, a guard interval length detector 340, an FFT window position controller 360, and an FFT 370. The symbol start position difference detector 330 is comprised of a symbol delay 332, a subtractor 334 and an absolute value calculator 336.

Figure 3:
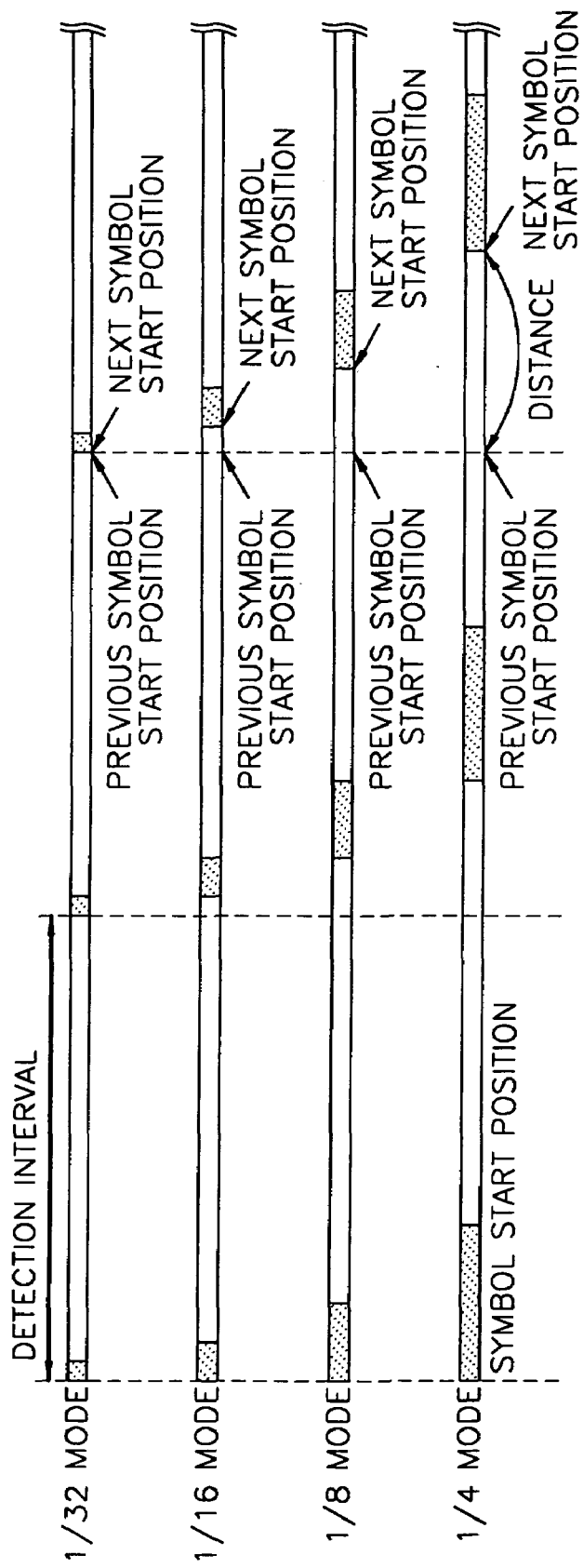
FIG. 3 is a timing view illustrating the transition of a symbol start position according to a guard interval mode (1/32 mode, 1/16 mode, 1/8 mode, or 1/4 mode).

Referring to FIG. 3, a detection period corresponds to the length of an OFDM symbol in a 1/32 mode, and is repeated in units of 2112 samples being the sum of a guard interval and a useful data interval. The symbol start position detector 320 detects a symbol start position in this detection period. A greyed portion in the detection period is a guard interval, and the remaining portion is a useful data interval.

The operation and effects of the present invention will now be described referring to FIGS. 2 and 3.

As shown in FIG. 2, the ADC 310 samples an input OFDM signal and converts the sampled OFDM signal into digital data as expressed by the following Equation 2:

$$y(k)=y(t), t=kT \quad (2)$$

wherein y(k) is a sampled complex signal, y(t) is a received OFDM signal, k is an integer (0, 1, 2, . . . ), and T is a regular sample period of the ADC 310.

The symbol start position detector 320 detects a symbol starting portion using a method of finding a maximum position of a correlation value between received complex signals y(k) or finding a point in time where the correlation value between quantized received signal values is maximum. Also, the symbol start position detector 320 detects the symbol start position when the length of a guard interval is set to a minimum length (a 1/32 mode in this embodiment). Here, the position of an output obtained by consecutively detecting the guard interval length is shifted at a regular interval in cases other than when the actual length of the guard interval is the 1/32 mode. That is, as shown in FIG. 3, when the guard interval is the 1/32 mode, no position shift occurs between symbol start positions (between a previous symbol start position and the next symbol start position). When the guard interval is the 1/16 mode, the position of the guard interval is shifted by 1/32 of the useful data interval between the symbol start positions (between a previous symbol start position and the next symbol start position). When the guard interval is the 1/8 mode, the position of the guard interval is shifted by 3/32 of the useful data interval between the symbol start positions (between a previous symbol start position and the next symbol start position). When the guard interval is the 1/4 mode, the position of the guard interval is shifted by 7/32 of the useful data interval between the symbol start positions (between a previous symbol start position and the next symbol start position). However, in an actual receiving environment, additive white gaussian noise (AWGN), multi-path channel distortion, etc. have influence, so that the position shift between adjacent symbols is made at inaccurate intervals, and the distribution of position shift intervals capable of occurring according to the mode of each guard interval overlaps significantly. Therefore, the accurate length of guard interval cannot be detected.

Accordingly, the symbol start position difference detector 330 detects the difference between a current symbol start position detected by the symbol start position detector 320 and a symbol start position delayed for at least 2 symbols. Here, the symbol delay 332 delays the symbol start position detected by the symbol start position detector 320 for a 2 symbol period in a best mode, to reliably detect the difference between the symbol start positions under the influence of noise and so on.

The subtractor 334 obtains the difference between the symbol start position output by the symbol delay 332 and the symbol start position output by the symbol start position detector 320. The symbol start position difference value output by the subtractor 334 is a position shift value at the symbol start position. The present invention uses only the size of the difference between the symbol start positions, so the absolute value calculator 336 calculates the absolute value of the output of the subtractor. The guard interval length detector 340 compares the symbol start position difference detected by the symbol start position difference detector 330 with a decision reference value prestored in a storage means such as a ROM, etc., and detects the length of a corresponding guard interval. Here, the decision reference value, used to decide the mode of the guard interval length, is set through an experiment. For example, the guard interval length detector 340 detects a guard interval length of a 1/32 mode when the difference between two symbol-delayed symbol start positions (between a previous symbol start position and the next symbol start position) is less than 20 samples (a 1/32 mode portion of FIG. 3). The guard interval length detector 340 detects a guard interval length of a 1/16 mode when the difference (distance) between the symbol start positions is between 100 samples and 150 samples (a 1/16 mode portion of FIG. 3). The guard interval length detector 340 detects a guard interval length of a 1/8 mode when the difference (distance) between the symbol start positions is between 350 samples and 400 supplies (a 1/8 mode portion of FIG. 3). The guard interval length detector 340 detects a guard interval length of a 1/4 mode when the difference between the symbol start positions is less than 1000 samples but greater than 400 samples (a 1/4 mode portion of FIG. 3).

Information on the guard interval length of the guard interval length detector 340 is output to the FFT window position controller 360, and simultaneously fed back to the symbol start position detector 320. The symbol start position detector 320 converts the existing guard interval length into a guard interval length newly input from the guard interval length detector 340, detects a symbol start position using the converted guard interval length information, and outputs the resultant value to the FFT window position controller 360.

Thus, the FFT window position controller 360 transfers an FFT window position using the guard interval length detected by the guard interval length detector 340 and the symbol start position information input from the symbol start position detector 320, and activates the fast Fourier transform (FFT), selecting only the useful data portion. The FFT 370 performs FFT on data generated by the ADC 310 according to an FFT window position control signal generated by the FFT window position controller 360, and outputs an OFDM signal which has been fast-Fourier-transformed.

INDUSTRIAL APPLICABILITY

According to the present invention as described above, the lengths of various guard intervals are automatically detected in an OFDM receiver, thus performing accurate FFT window recovery.

What is claimed is:

1. A method of detecting a type of guard interval, the guard interval being used to recover a symbol start position in an orthogonal frequency division multiplexing (OFDM) receiver, wherein an OFDM symbol comprises a useful data interval and the guard interval, the method comprising the steps of:
    (a) detecting a difference between a symbol start position of a received OFDM signal and a symbol start position delayed by at least two symbols; and
    (b) detecting a length of the guard interval by comparing the symbol start position difference detected in step (a) with a predetermined guard interval decision reference value.

2. An apparatus for detecting a type of guard interval in an orthogonal frequency division multiplexing (OFDM) receiver for receiving an OFDM symbol comprising useful data interval and the guard interval, wherein the OFDM signal is used to recover a fast Fourier transform (FFT) window position, the apparatus comprising:
    an analog-to-digital converter (ADC) for converting a received OFDM signal into digital complex samples;
    a symbol start position detector for detecting a symbol start position with reference to information in the guard interval length of the complex samples output by the ADC;
    a symbol start position difference detector for detecting a difference between the symbol start position detected by the symbol start position detector and a symbol start position delayed by a predetermined symbol time;
    a guard interval length detector for comparing the symbol start position difference detected by the symbol start position difference detector with a predetermined guard interval decision reference value, and detecting the length of the guard interval; and
    an FFT window position controller for shifting the FFT window position using the guard interval length detected by the guard interval length detector and the symbol start information detected by the symbol start detector, to activate an FFT in accordance with the shifted FFT window position.

3. The apparatus for detecting the type of guard interval in an OFDM receiver as claimed in claim 2, wherein the symbol start position difference detector comprises:
    a symbol delay for delaying by two symbols the symbol start position detected by the symbol start position detector; and
    a subtractor for calculating the difference between the symbol start position detected by the symbol start position detector and the symbol start position output by the symbol delay.

4. The apparatus for detecting the type of guard interval in an OFDM receiver as claimed in claim 3, wherein the symbol start position difference detector further comprises:
    an absolute value calculator for calculating an absolute value of the symbol start position difference output by the subtractor.

5. The apparatus for detecting the type of guard interval in an OFDM receiver as claimed in claim 2, wherein the symbol start position detector detects an initial symbol start position when the guard interval length is set to a 1/32 mode.

6. The apparatus for detecting the type of guard interval in an OFDM receiver as claimed in claim 2, wherein the symbol start position difference detected by the symbol start position difference detector is a symbol start position shifted value.

7. A method of detecting a type of guard interval, the guard interval being used to recover a symbol start position in an orthogonal frequency division multiplexing (OFDM) receiver, wherein an OFDM symbol comprises a useful data interval and the guard interval, the method comprising the steps of:
    a) detecting a symbol starting position of a received OFDM signal;
    b) detecting a difference between the symbol start position of the received OFDM signal and a symbol start position delayed by at least two symbols;
    c) detecting a length of the guard interval by comparing the symbol start position difference detected in step (b) with a predetermined guard interval decision reference value;
    d) determining a fast Fourier transform window position and an updated guard interval length based on the length of the guard interval of step (c); and
    e) activating a fast Fourier transform on the received OFDM signal corresponding to the fast Fourier transform window of step (d).

8. The method according to claim 7, wherein the symbol starting position of step (a) is detected by finding a maximum position of a correlation value between a received complex signals.

9. The method according to claim 7, wherein the symbol starting position of step (a) is detected by finding a point in time where a correlation value between quantized received signals is maximum.

10. The method according to claim 7, wherein the difference between the symbol starting position in step (b) is determined using a subtractor.

11. The method according to claim 7, wherein the fast Fourier transform of step (e) is performed on the useful data interval of the OFDM signal.

12. The method according to claim 7, wherein the detection of the length of the guared interval is performed automatically.

* * * * *